United States Patent
de Oliveira et al.

(10) Patent No.: US 10,579,995 B2
(45) Date of Patent: Mar. 3, 2020

(54) EVENT ACCESS WITH DATA FIELD ENCRYPTION FOR VALIDATION AND ACCESS CONTROL

(75) Inventors: Marcelo Gomes de Oliveira, Miami, FL (US); Percival Jatoba, Sao Paulo (BR)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 13/074,245

(22) Filed: Mar. 29, 2011

(65) Prior Publication Data

US 2011/0246369 A1    Oct. 6, 2011

Related U.S. Application Data

(60) Provisional application No. 61/329,022, filed on Apr. 28, 2010, provisional application No. 61/319,226, filed on Mar. 30, 2010.

(51) Int. Cl.
*G06Q 20/38* (2012.01)
*G06Q 20/40* (2012.01)

(52) U.S. Cl.
CPC ....... *G06Q 20/3823* (2013.01); *G06Q 20/382* (2013.01); *G06Q 20/40* (2013.01)

(58) Field of Classification Search
CPC ... G06Q 20/382; G06Q 20/3823; G06Q 20/10
(Continued)

(56) References Cited

U.S. PATENT DOCUMENTS 6,223,166 B1 * 4/2001 Kay .................................. 705/5
6,325,292 B1 12/2001 Serh
(Continued)

FOREIGN PATENT DOCUMENTS

BR    0506044 A    3/2007
BR    0504184-8 A    6/2007
(Continued)

OTHER PUBLICATIONS

D. Skarica, H. Belani and S. Illes, "Implementation and evaluation of mobile ticket validation systems for value-added services," SoftCOM 2009 [online] [retrieved on Jul. 8, 2019]. Retrieved from the Internet: <URL:http://ieeexplore.ieee.org/stamp/stamp.jsp?tp=&arnumber=5306831&isnumber=5306808> (Year: 2009).*
(Continued)

*Primary Examiner* — James M Detweiler
*Assistant Examiner* — Monica A Mandel
(74) *Attorney, Agent, or Firm* — Kilpatrick Townsend & Stockton LLP

(57) ABSTRACT

The utility of a portable consumer device is extended by allowing account holders the ability to gain entry into access-controlled venues (e.g., baseball or soccer game, cinema, public transit) using a portable consumer device that is associated with an account that was used to purchase the admission or tickets to the event at the access-controlled venue. Techniques disclosed allow cardholder authentication in a non-payment setting that enables cardholders access to a location or a specific event. A first validation cryptogram is generated in the purchase cycle and is stored. A second validation cryptogram is generated in the validation cycle at the venue. If the second validation cryptogram matches the first validation cryptogram, the consumer is granted access. Validation cryptograms may be based on input data that is specific to the payment card holder (e.g., primary account number), specific to the ticket selling merchant (e.g., merchant identifier), specific to the event (e.g., event identifier, date/time, location, etc.), and/or specific to the transaction (e.g., authorization code from a payment network). Based on the input data, validation cryptograms may be generated using encryption, hashing, a combination of encryption and hashing, and/or other operations on the input data.

18 Claims, 8 Drawing Sheets

(58) Field of Classification Search
USPC .......................................................... 705/64
See application file for complete search history.

(56) References Cited

U.S. PATENT DOCUMENTS

| | | | |
|---|---|---|---|
| 6,484,182 B1* | 11/2002 | Dunphy et al. ............... 700/231 |
| 6,725,376 B1 | 4/2004 | Sasmazel et al. |
| 6,830,182 B2 | 12/2004 | Izuyama |
| 6,961,858 B2* | 11/2005 | Fransdonk ...................... 726/29 |
| 6,999,936 B2 | 2/2006 | Sehr |
| 7,020,635 B2* | 3/2006 | Hamilton et al. .............. 705/51 |
| 7,044,362 B2 | 5/2006 | Yu |
| 7,080,049 B2* | 7/2006 | Truitt et al. ..................... 705/75 |
| 7,090,128 B2* | 8/2006 | Farley et al. ................. 235/384 |
| 7,093,130 B1* | 8/2006 | Kobayashi .............. G06F 21/64 705/67 |
| 7,107,462 B2* | 9/2006 | Fransdonk ..................... 713/193 |
| 7,150,045 B2* | 12/2006 | Koelle et al. ................... 726/26 |
| 7,392,226 B1* | 6/2008 | Sasaki et al. ................... 705/64 |
| 7,555,361 B2 | 6/2009 | Nakamura et al. |
| 7,587,502 B2* | 9/2009 | Crawford et al. ............ 709/229 |
| 7,620,606 B2* | 11/2009 | Gentry et al. .................. 705/76 |
| 7,711,586 B2* | 5/2010 | Aggarwal et al. ................ 705/5 |
| 7,757,943 B2 | 7/2010 | D'Angelo et al. |
| 8,002,175 B2* | 8/2011 | Kuriyama et al. ........... 235/379 |
| 8,346,580 B2* | 1/2013 | Nakfoor ............................ 705/5 |
| 2001/0032250 A1* | 10/2001 | Kusakabe ............ G06Q 20/045 709/217 |
| 2001/0056368 A1 | 12/2001 | Oguro |
| 2002/0111921 A1* | 8/2002 | Aupperle ........................ 705/75 |
| 2002/0153994 A1 | 10/2002 | Bonner et al. |
| 2003/0069810 A1* | 4/2003 | Gathman et al. ............... 705/27 |
| 2003/0154169 A1* | 8/2003 | Yanai .................... G06Q 10/02 705/65 |
| 2003/0171960 A1 | 9/2003 | Skinner |
| 2004/0188520 A1 | 9/2004 | Kohta |
| 2005/0021365 A1 | 1/2005 | Nakfoor |
| 2005/0070257 A1* | 3/2005 | Saarinen et al. ........... 455/414.1 |
| 2005/0283594 A1 | 12/2005 | Kano |
| 2006/0040726 A1* | 2/2006 | Szrek ................... G06Q 20/341 463/17 |
| 2006/0165060 A1* | 7/2006 | Dua ....................... G06O 20/20 370/352 |
| 2007/0102511 A1 | 5/2007 | Park |
| 2008/0071637 A1* | 3/2008 | Saarinen et al. ................ 705/26 |
| 2008/0116264 A1 | 5/2008 | Hammad et al. |
| 2008/0183622 A1* | 7/2008 | Dixon .................. G06Q 20/027 705/44 |
| 2009/0188983 A1 | 7/2009 | Walker |
| 2009/0239512 A1 | 9/2009 | Hammad et al. |
| 2010/0070312 A1 | 3/2010 | Hunt |
| 2010/0075638 A1 | 3/2010 | Carlson |
| 2010/0082491 A1* | 4/2010 | Rosenblatt ............. G06Q 10/02 705/65 |
| 2010/0138338 A1 | 6/2010 | Hammad |
| 2011/0040655 A1 | 2/2011 | Hendrickson |
| 2011/0055058 A1 | 3/2011 | Hammad |

FOREIGN PATENT DOCUMENTS

| | | |
|---|---|---|
| DE | 100 16 701 A1 | 10/2001 |
| DE | 10016701 A1 | 10/2001 |
| DE | 101 38 848 A1 | 2/2003 |
| DE | 10136848 A1 | 2/2003 |
| GB | 2390211 A | 12/2003 |
| JP | 2002-024464 A | 1/2002 |
| JP | 2003/006366 A | 1/2003 |
| JP | 2004/021722 A | 1/2004 |
| KR | 10-2000-0054445 A | 9/2000 |
| WO | WO 94/29112 | 12/1994 |
| WO | WO 01/84504 A2 | 11/2001 |
| WO | WO-2001084504 A2 | 11/2001 |
| WO | WO 2006/020820 A2 | 2/2006 |
| WO | WO 2006/020908 A2 | 2/2006 |
| WO | WO 2009/027607 A2 | 3/2009 |

OTHER PUBLICATIONS

International Preliminary Report on Patentability for PCT/US2001/030475, dated Oct. 11, 2012. 7 pages.
Exam Report dated Jul. 17, 2015 in Australian Patent Application No. 2011238587, 5 pages.
Office Action (English Translation) dated Jun. 2, 2015 in Chinese Patent Application No. 2011800145698, 5 pages.
Patent Examination Report No. 1, dated Jul. 31, 2014, for Australian Patent No. 2011238587, 4 pages.

* cited by examiner

EVENT ACCESS WITH DATA FIELD ENCRYPTION FOR VALIDATION AND ACCESS CONTROL

CROSS-REFERENCES TO RELATED APPLICATIONS

The present application is a non-provisional application of and claims priority to U.S. Provisional Application Nos. 61/319,226 and 61/329,022, filed on Mar. 30, 2010 and Apr. 28, 2010, respectively, the entire contents of which are herein incorporated by reference for all purposes.

BACKGROUND

Consumers are typically required to use paper tickets for entry to a specific event, such as a football game or the cinema, for example. Traditional paper tickets present many problems and disadvantages. For example, the use of paper tickets often requires consumers to queue up for tickets (e.g., lines at the will call window). Additionally, consumers need to worry about storing their paper tickets prior to entering the event, which is inconvenient. Traditional tickets can be lost, misplaced, or stolen. When this occurs, the consumer typically has no recourse but to buy new tickets. Furthermore, with traditional tickets, consumers may have to deal with scalpers and the risk of purchasing counterfeit tickets.

Portable consumer devices, such as payment cards, may be used in lieu of tickets. However, it would be unsecure and undesirable to have a list of credit card numbers (or other sensitive personal or financial information) stored at a venue or, even worse, at every entrance point to a venue. Additionally, the venue operator must be able to differentiate not only between consumer associated with a payment card or payment account, but the venue operator must be able to differentiate between events to which the consumers is entitled access to, the specific date, time or showing of the event that the consumer is entitled to access, and what level of access the consumer is entitled to, etc. This could be accomplished by maintaining a separate list or database of payment card numbers for each specific event. This would have the undesirable consequence of proliferating the availability of sensitive info, increasing the risk of security breaches, and make the entire system complex and unwieldy. Therefore, a ticketing solution using portable consumer devices in place of traditional tickets, where sensitive personal and financial data is protected in transit and storage, is desired.

Embodiments of the technology disclosed herein address these and other problems, individually and collectively.

BRIEF SUMMARY

Techniques for using a portable consumer device for event access in lieu of tickets in order to grant entry into the venue, while protecting sensitive data, are provided.

In one embodiment, a method comprises receiving information associated with an account at an access purchase terminal, receiving a selection of a specific event to be purchased by a consumer, and generating a first validation cryptogram. The access purchase terminal may be used to purchase admission to an access controlled event and the specific event selected may be associated with event-specific data (e.g., an event identifier, time, date, location, etc.). The first validation cryptogram may later be compared to a second validation cryptogram, and access may be permitted if the first validation cryptogram and the second validation cryptogram are acceptable (e.g., if the cryptograms match). The second validation cryptogram may be generated after receiving information associated with the account at a point of validation terminal using portions of the information associated with the portable consumer device and/or event-specific data.

In one embodiment, a server comprises a processor and a non-transitory computer-readable medium coupled to the processor, including code that is executable by a processor, for implementing a method. The method comprises receiving information associated with an account at an access purchase terminal, receiving a selection of a specific event to be purchased by a consumer, and generating a first validation cryptogram. The access purchase terminal may be used to purchase admission to an access controlled event. The specific event selected may be associated with event-specific data. The first validation cryptogram may be later compared to a second validation cryptogram, and access may be is permitted if the first validation cryptogram and the second validation cryptogram are acceptable.

In one embodiment, a method comprises receiving information associated with an account at a point of validation terminal, generating a first validation cryptogram using information associated with an account and event-specific data, and receiving an access permissions message if the first validation cryptogram is determined to be acceptable. The point of validation terminal may be used to validate access permissions that are associated with an access controlled event. The first validation cryptogram may be acceptable if the first validation cryptogram matches a previously generated second validation cryptogram. The previously generated second validation cryptogram is stored in a validation cryptogram database is located at a venue where the event occurs and is coupled to the point of validation terminal or it may be stored on a point of validation terminal at the venue. The validation cryptogram may be generated using a cryptogram generator that includes an encryption module for encrypting data in accordance with the Data Encryption Standard (DES).

In one embodiment, a point of validation terminal comprises a processor and a non-transitory computer-readable medium coupled to the processor, including code that is executable by a processor, for implementing a method. The method comprises receiving information associated with an account at an input of the point of validation terminal, generating a first validation cryptogram using information associated with an account and event-specific data, and receiving an access permissions message if the first validation cryptogram is determined to be acceptable. The point of validation terminal may be used to validate access permissions that are associated with an access controlled event. Generating the first validation cryptogram may include sending the information associated with the account to a venue validation server.

In one embodiment, a method comprises retrieving information associated with an account of a consumer, encrypting information associated with the account of a consumer and event-specific data, and storing the results of the encryption to a cryptogram validation database. The event-specific data may be associated with a specific event selected by a consumer, and results of the encryption comprise a first validation cryptogram.

In one embodiment, a server comprise a processor, a memory coupled to the processor, an encryption module coupled to the processor, and a validation cryptogram database. The encryption module may encrypt at least information associated with an account of a consumer and event-specific data is associated with a specific event selected by a consumer to generate a cryptographic token value. The cryptographic token value may be stored in the validation cryptogram database. The server may be in operative communication with a point of sale terminal, automated teller machine, ticket kiosk, or other access purchase terminal.

In one embodiment, a method of generating a cryptogram at a point of validation terminal may comprise retrieving information associated with an account of a consumer by reading a portable consumer device, encrypting information associated with the account of a consumer and event-specific data, wherein the event-specific data is associated with a specific event selected by a consumer, and comparing the results of the encryption to a cryptogram validation database, wherein the database contains valid cryptograms.

In one embodiment, a point of validation terminal may comprise a processor, a memory coupled to the processor, an encryption module coupled to the processor, and a validation cryptogram database. The encryption module may encrypt at least information associated with an account of a consumer and event-specific data is associated with a specific event selected by a consumer to generate a cryptographic token value. The cryptographic token value may be stored in the validation cryptogram database contained on the point of validation terminal itself or on a server (e.g., venue validation server or merchant validation server) in operative communication with the point of validation terminal.

Further details regarding other embodiments of the technology are provided below.

DETAILED DESCRIPTION

Figure 1:
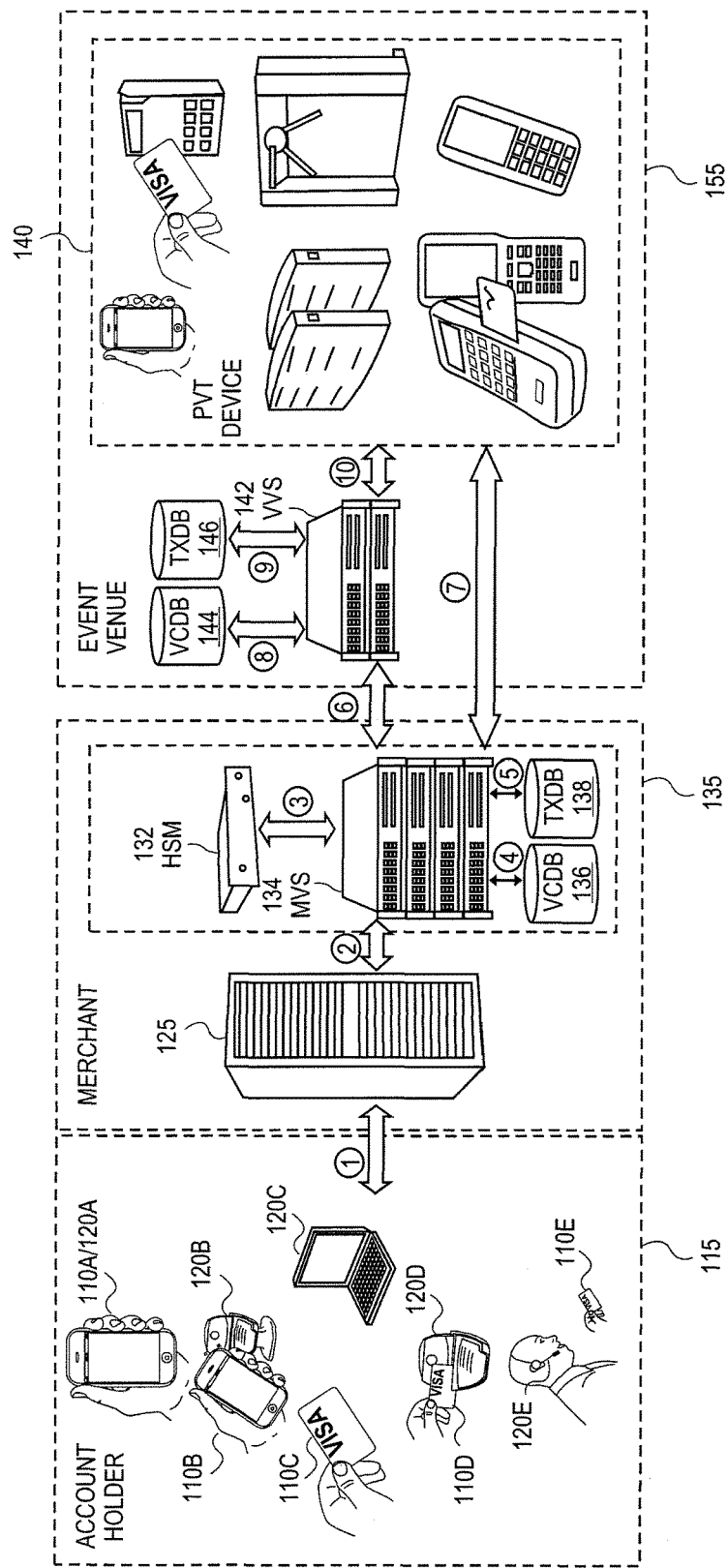
FIG. 1 shows a diagram of a system for using a portable consumer device for event access in accordance with an embodiment of the present invention.

Techniques for using a portable consumer device for event access are provided herein that overcome conventional techniques for obtaining access to an event. The techniques disclosed herein extend the utility of a portable consumer device by allowing account holders the ability to gain entry into entertainment venues (e.g., football game or cinema) using the same portable consumer device used to make the ticket purchase in lieu of paper tickets. The techniques disclosed allow cardholder authentication in a non-payment setting that enables cardholders access to a location or a specific event. Because the same portable consumer device that is used to make the purchase is also used to gain entry into the venue, it eliminates the need to either hold on to paper tickets, to purchase potentially counterfeit tickets from a third party, or to pay exorbitant fees of a scalper. Also, because these tickets are purchased with a payment terminal, there is no need to queue up for tickets at the stadium, wait to receive tickets in the mail, or print tickets out at a home/office printer. One of the embodiments allows cardholder authentication in a non-payment setting that enables cardholders to access a location or a specific event. Embodiments described herein extend the utility of the portable consumer device or payment card by allowing the card or device to be used for both payment transactions and event access.

In one exemplary embodiment, a consumer purchases tickets to an access-controlled event (e.g., sporting or cultural event, airplane tickets, transit passes, etc.) at a venue (e.g., stadium, theatre, airport, subway terminal, etc.). Once a consumer purchases his or her "ticket" with his or her payment card or other portable consumer device, his or her payment card is used in lieu of a physical ticket and becomes the means of entry to the venue.

Validation cryptograms may be used to identify and validate a consumer and determine whether that person is permitted to access the event venue. In one embodiment, at least two cryptograms are generated: a first cryptogram is generated in the purchase cycle, and a second cryptogram is generated during the validation cycle at the entrance to the venue. The validation cycle may occur in a non-payment setting.

A validation cryptogram can be a cryptographic value originally generated by a merchant validation server during or after the original purchase payment transaction processing. The validation cryptogram can then stored to a database of valid cryptograms. When a payment card is swiped (or otherwise read) at a point of validation terminal at the venue point of entry, the validation cryptogram is recalculated and compared with the validation cryptogram values stored in the database. The database may be in operative communication with the venue validation server and/or merchant validation server. If a match is found, access is granted to the payment card holder and/or guests.

When validation cryptograms are "compared," this may refer to a function that to examines the character or qualities of the two or more validation cryptograms to discover resemblances and/or differences. If after a comparison, the validation cryptograms are acceptable, access may be granted to the consumer. In one embodiment, the validation cryptogram is acceptable if after examining the cryptogram for differences and resemblances, it is determined that the two cryptograms are exactly the same, e.g., a bit-for-bit match. In one embodiment, the validation cryptogram is acceptable if after examining the cryptogram for differences and resemblances, it is determined that the two cryptograms are sufficiently similar or close, e.g., if all material pieces of information or data match and the only differences are insignificant. For example, leading zeros may be an insignificant difference.

Validation cryptograms may be based on input data that is specific to the payment card holder (e.g., primary account number), specific to the ticket selling merchant (e.g., merchant identifier), specific to the event (e.g., event identifier, date/time, location, etc.), and/or specific to the transaction (e.g., authorization code from a payment network). Based on the input data, validation cryptograms may be generated using encryption, hashing, a combination of encryption and hashing, and/or other operations on the input data.

Exemplary System

FIG. 1 illustrates a diagram of a system for using a portable consumer device for event access. The system includes an account holder interface subsystem 115, a merchant subsystem 135, and a venue subsystem 155.

The account holder interface subsystem 115 provides an interface for an account holder to communicate and interact with a merchant. The merchant typically sells access to events or other access-controlled areas, where payment is required for admission to the event or access-controlled area. For example, the merchant may be a ticket vendor that sells tickets for sporting or entertainment events or a venue operator.

An "access-controlled venue" can refer to any location where access is limited and generally a ticket or other proof of payment for admission is required to gain entrance into the venue (e.g., sports stadium or arenas, movie theatres, music halls and amphitheatres, museums, amusement parks, public transit systems, etc.). An event may be any sporting, cultural, or entertainment event hosted at an access-controlled venue. For example, an event may be, but is not limited to, a sporting game or match, concert, movie, play, opera, ballet, airline flight, art display, guided tour, a hotel room reservation, or a public transit ride.

The account holder may have one or more accounts that are issued and maintained by an issuer. An issuer is a financial institution, generally a bank, that creates and maintains financial accounts. The account may be associated with a portable consumer device, such as, but not limited to, portables consumer devices 110a, 110b, 110c, 110d, and 110e. The portable consumer device may be any payment device, such as a credit or debit card. However, the portable consumer device for event access is not limited to traditional consumer devices, rather the portable consumer device may be any device capable of being used to make a payment. The portable consumer device may comprise a contact chip card, contactless chip card, smartcard, cellular phone, personal digital assistant (PDAs), payment chip, security card, access card, a device with magnetic stripe, smart media, NFC device, transponder, radio frequency identification device (RFID), and the like. Each portable consumer device may include a module, such as a computer chip with dedicated hardware, software, embedded software, or any combination thereof, that is used to perform actions associated with payment transactions. A computer-readable medium embodied by one or more memory devices may be operatively coupled to a processor.

Portable consumer device (or an account) may be used to purchase admission to an access-controlled venue. Admission to an access-controlled venue may be purchased via access purchase terminal or purchase terminal, such as, but not limited to, purchase terminals 120a, 120b, 120c, 120d, and 120e. An "access purchase terminal" or "purchase terminal" is any device that can be used to purchase admission, tickets, or vouchers for entry into an access-controlled venue. For example, purchase terminal may be an automated teller machine (ATM), point of sale (POS) terminal, an electronic cash register (ECR), a kiosk, website, magnetic stripe reader device, mobile device, mobile phone, landline phone, personal computer, or any other location where consumer payment devices and/or account numbers are accepted for payment or to conduct other financial transactions.

The ticket price or admission fee, is paid using purchase terminal (e.g., 120a-e). When the account holder attempts to use the account to pay for admission to an access-controlled event, the issuer determines whether or not to approve or deny the authorization request message. The authorization/denial of transaction may occur by sending an authorization request message to the payment processing network and receiving an authorization response message.

The account holder interface subsystem 115 shows illustrative embodiments of how an account holder may be used to purchase admission to an access-controlled venue. An account may be used to purchase admission at a purchase terminal (e.g., 120a-e) in a number of ways.

In one embodiment, a mobile device acts as both the portable consumer device (in that it is associated with an account) and the purchase terminal. Portable consumer device/purchase terminal 110a/120a may be used to purchase tickets using the Internet or an application (e.g., an "app") on the mobile device.

In another embodiment, a portable consumer device may be used at a merchant terminal or reader to purchase tickets (or other forms of admission to an access-controlled event). For example, the portable consumer device 110b may be a mobile phone associated with an account. The mobile phone may have a contact or contactless element that communicates with contact (or contactless) reader 120b. In another example, the portable consumer device 110c may be a card with account information, such as a primary account number, expiration date, and/or verification value. In one embodiment, the account information may include personal information of the account holder, such as billing address, zip code, phone number, email address, initials, etc. The account information may be entered into a merchant's form on a webpage being displayed by a personal computer (PC). The user's PC is the purchase terminal in this embodiment. In yet another example, the PC may include a contact or contactless reader embedded or attached to it for reading account information associated with the account. The PC may be operated by a merchant or by the account holder.

In another embodiment, the portable consumer device may be a card with a magnetic stripe 110d and the purchase terminal may include a magnetic stripe reader 120d. The purchase terminal with magnetic stripe reader may read account information, such as a primary account number, expiration date, and/or verification value, when the card is swiped to make a purchase.

In another embodiment, the portable consumer device may be a payment card 110e and the purchase terminal may include a telephone, a merchant agent, and a merchant computer system (120e). The card holder may call the merchant agent and communication a selection of an event to purchase access to. The merchant agent may enter card holder information, such as account and personal information, and the agent may enter data for the event selected and purchased by the consumer into the merchant computer system.

In one embodiment, purchase terminal is a point of sale (POS) device or terminal. In another embodiment, purchase terminal is an electronic cash register ECR. In yet another embodiment, purchase terminal is a kiosk. The kiosk may be a self-service kiosk with a user interface for the consumer to use to purchase tickets or it may be operated by a merchant's agent. The purchase terminal may be communicatively coupled to a computer-readable medium, including code executable by a processor, for allowing consumers to buy tickets with credit cards and debit cards, or any other consumer payment device. The code may comprise a software application that allows the purchase termination to capture financial data and non-financial data (e.g., event or game, section, seat). The application may send the non-financial data to a ticketing server. The application may send the financial data to a payment processing network.

The merchant subsystem 135 may include a merchant validation server 134, a merchant server 125, a host security module (HSM) 132, a validation cryptogram database 136, and a transaction database 138.

The merchant validation server (MVS) may include one or more computers. The MVS may be compliant with the PCI DSS and PCI PA-DSS specifications. The MVS may generate a validation cryptogram after the original purchase payment transaction is authorized. After generating a validation cryptogram, the MVS stores the validation cryptogram to a database containing valid validation cryptogram values (validation cryptogram database 136), which can be distributed to the proper computer systems or devices at the event venue. The MVS may also have a transaction database 138, which stores transaction information for the transactions that have been conducted. Although referred to herein as a "merchant" validation server, it is appreciated that any suitable party could operate the MVS 134. The merchant may optionally operate one or more servers, such as merchant server 125, that interface and interact with the consumer. In other embodiments, the MVS and the merchant server may be combined into a single server or series of servers. The merchant validation server (MVS) may include one or more host security module (HSM) running specialized applications.

The MVS and/or HSM may also create and manage the master key (MK) distribution. Unique derived key, UDK, may comprise keys UDKA and UDKB. UDKs may be based on a primary account number (PAN) and therefore may be unique per portable consumer device associated with a given PAN. The UDK may be derived from a master key that is generated using an HSM and the master key may be distributed to the point of validation terminals (or venue validation server). In one embodiment, master keys may be unique per merchant. For example, Cinemark, AMC, and CineLux may each have a different, unique master key. That master key may have been generated by an HSM in operative communication, or part of, the respective theatre's merchant validation server. In another example, different airline carriers may have unique master keys generated by HSMs associated with their respective MVS. In one embodiment, a merchant would use a single unique master key for all of its point of validation terminals (e.g., at different locations throughout the country and/or at different entrances to those particular locations), while the event derived key may be specific to a particular event and/or time slot. In another embodiment, a particular merchant may have more than one unique master key.

Portable consumer device (e.g., 110*a-e*) may be used to make a purchase in a payment processing network comprising a merchant, an acquiring bank, a credit card association, and an issuer. The portable consumer device may have other authentication data to identify the consumer and a payment account associated with the consumer. The authentication data may comprise account holder name, credit card account information, account number, bank identification number (BIN), card verification value (CVV), credit limit, consumer information, etc. may be used to make a purchase using a payment processing network.

The venue subsystem 155 may include a venue validation server 142, a validation cryptogram database 144, a transaction database 146, and one or more point of validation terminals 140. The venue validation server 142 and validation cryptogram database 144 are not required, as the point of validation terminal may contain and be able to process the appropriate information or it may be in operative communication with a merchant validation server. In order to gain entry into a venue for the particular event for which tickets were purchased, the cardholder uses the same portable consumer device 110 that was used to make the purchase in lieu of using a traditional paper ticket. When a consumer arrives at the venue, the consumer uses one of the point of validation terminals (140) to swipe or otherwise read the portable consumer device 110 at the event gate. The point of validation terminal 140 can be located at a turnstile entrance (or other entrance gate) to the event. The reader may be any suitable reader technology, such as a magnetic stripe reader, contact/contactless device reader, NFC reader, bar code reader, scanners and other similar technologies.

The venue validation server (VVS) 142 may include one or more computers running a specialized application. The VVS may validate validation cryptograms sent by a point of validation terminal against a database of valid validation cryptogram values originally generated by an MVS during the payment transaction processing. In one embodiment, the database of valid validation cryptogram values originally generated by an MVS during the payment transaction processing is located at the venue (e.g., locally on point of validation terminals or on a venue validation server at the venue). In another embodiment, the database of valid validation cryptogram values is located off-site (not at the venue), and either a venue server or the point of validation terminals are in operative communication with the database of valid validation cryptogram values (e.g., MVS 134 or validation cryptogram database 136).

The VVS contains, or is in operative communication with, a validation cryptogram database 144 (or 136). The validation cryptogram database 144 contains a plurality of validation cryptograms that are associated with paid-for admission to an access-controlled venue. A transaction database 146 stores a log of transaction history information.

The one or more point of validation terminals (PVTs) 140 accept portable consumer device 110 information. The portable consumer device information may be read by the PVT or may be input manually into the PVT. Using the information read at the point of validation terminal, either the point of validation terminal and/or the venue validation server (or merchant validation server) calculates a validation cryptogram. If the validation cryptogram generated during the purchase cycle matches the validation cryptogram generated in the validation cycle, the consumer and their guest are admitted.

Point of validation terminals or venue validation servers may be preprogrammed with event-specific data and/or merchant data to calculate validation cryptogram values. For example, at a specific-event, any valid cryptogram may have been generated using the event-specific information for that particular event. Therefore, the point of validation terminals or venue validation servers may be programmed with the event-specific data so that the particular event specific data can used in each validation cycle.

Technical Advantages

There are numerous technical advantages to embodiments of the present invention. For example, using a portable consumer device as a "ticket" eliminates the need to print or manufacture traditional paper or card tickets. This saves costs and is convenient to the consumer. The consumer does not need to carry an additional item to gain admission into an access controlled event beyond the portable consumer device that the consumer used to purchase the admission(s).

Embodiments of the present invention offer increased security. Portable consumer devices contain sensitive personal and financial information, and validating portable consumer devices, even in a non-financial setting, requires that computer systems contain information that will permit validation and authentication of the portable consumer device. For example, one method of validation portable consumer devices might involve maintaining a list of all primary account numbers that have purchased admission to an event on a server at the venue or on each gate or turnstile device. This, however, could compromise sensitive personal and financial data. Therefore, an advantage to embodiments of the present invention is that personal and financial data is secured by encryption, hashing, and other operations. In this way, personal and financial data is more secure in transit (between ticket seller and venue operators, for example) and in storage (on the ticker seller's servers and the venue's servers or entrance terminals/devices). Accordingly, embodiments of the present invention allow for more limited distribution of "plain text" sensitive information.

Embodiments of the present invention offer increased computation speed during the validation cycle. It is desirable for tickets to be validated at an event venue as quickly as possible because otherwise long lines may form. Rather than storing a large data set associated with portable consumer device holders that are entitled to access, embodiments of the present invention use hashing and other data manipulation techniques to reduce the amount of data that needs to be stored at the venue. This allows for fast validation and for the possibility of offline validations using point of validation terminals at a large number of entrances.

Exemplary Methods

Figure 2:
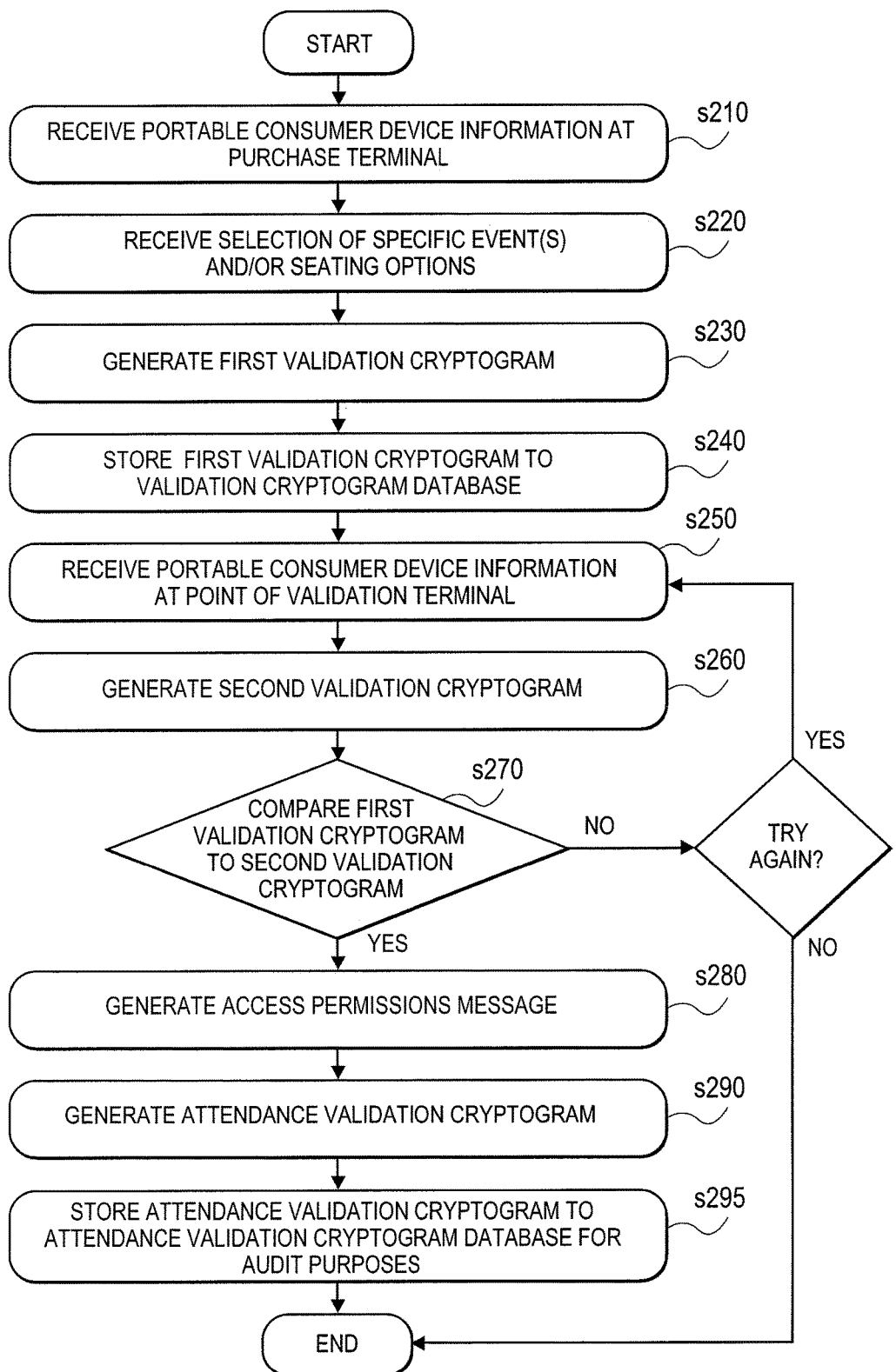
FIG. 2 shows a diagram of a method of generating and validating a cryptogram in accordance with an embodiment of the present invention.

FIG. 2 shows one embodiment of generating and validating a validation cryptogram in accordance with an embodiment the present invention. A "cryptogram" is code or cipher, such as a representation having a secret meaning. A "validation cryptogram" is a cryptographic token value. In one embodiment, a validation cryptogram may be an encrypted value, generated using an encryption algorithm and a key. In one embodiment, a validation cryptogram may be a hash value. A first validation cryptogram may be generated in the purchase cycle (s210-s240) by the merchant validation server. A second validation cryptogram may be generated in the validation cycle by either a point of validation terminal or a venue validation server. If the first and second cryptograms match, or are sufficiently close, the access is validated. The following steps may be performed in any suitable order, and in certain embodiments one or more of the steps may be omitted.

At s210, the consumer presents portable consumer device information to a merchant using a purchase terminal (e.g., any of purchase terminals 120a-120e in FIG. 1). In one embodiment, the portable consumer device (e.g., 110b or 110d) may be read by the purchase terminal (e.g., 120b or 120d). In one embodiment, the account information may be entered into the purchase terminal manually (e.g., 120a or 120c). In another embodiment, the account information may be communicated verbally by the consumer to a consumer service agent or automated system using a telephone (e.g., 120e). In another embodiment, the account information may be communicated by the consumer using a mail order form that is sent to the merchant.

Portable consumer device information may include a primary account number (PAN), credit card number, expiration date, card verification value (e.g., CVV, dCVV, CID), hardware identifier (e.g., SIM card number), or other suitable information that uniquely identifies the portable consumer device or an account associated with an issuer of a portable consumer device. The merchant may have a merchant identifier (e.g., merchant ID) or other number that uniquely identifies the specific merchant.

At s220, the consumer (or an agent acting under the direction of the consumer) selects a specific event to attend. Each event available for purchase may have event-specific information. "Event-specific data" or "event-specific information" is any data that describes an event (e.g., a unique event identifier), event location, event performer, event date, event start time, event end time, or any other information that describes the event. An "event-identifier" may refer to an alphanumeric representation that uniquely corresponds a particular event.

For example, in the transit context, event-specific data may could be an airline flight number/identifier, airport gate number/identifier, or train number/identifier. Event-specific information may also include the plane, train, or subway departure or arrival time and/or arrival or departure location(s). In an entertainment or sporting context, event-specific information may include the location of the venue, a section/row/seat number or identifier, schedule start an end time(s) for the event, or an identifier for the performer(s), performance(s), or team(s) playing. In a movie cinema context, where there are multiple showings of the same movie on one or more screens, the event-specific information may be unique per movie (i.e., "The King's Speech" or an alphanumeric identifier for that movie), unique per screen (i.e., screen X), and/or unique per time slot (i.e., 7:00 PM showing).

In one embodiment, event-specific information comprises an event identification number (EID) that is a unique identification for every event. The EID may be created by the merchant or by the event promoter. It is beneficial to have a unique identifier for each event because one purchaser could buy multiple tickets to different events at the same venue on the same day, but at a different time. For example, a cinema may have 5 screens showing 10 movies throughout the day at different times. In this example, in order to differentiate between movies and show times, the EID may be different for each movie and show time.

In one embodiment, event-specific information includes an event original date (EOD), which is the date originally set for the event. The EOD does not change even if the event is postponed or changed to a different date. It is beneficial to include EOD rather than, or in addition to, the actual event date so that the validation cryptograms can be properly matched even if the event date is changed or postponed.

The consumer may also select other event options. Event options may include any suitable options, including the number of tickets to purchase, the seating location, the date and/or time of the event, or special add-ons (concessions, souvenirs, etc.). The consumer communicates this information using a user interface on the purchase terminal (PC, mobile device, kiosk, etc) or verbally to an agent (e.g., on the phone or operating a POS terminal). The validation cryptogram database (or other database in operative communication with the venue validation server or point of validation terminals) may contain additional information regarding the sale transaction and/or event options that are associated with a particular validation cryptogram. For example, the validation cryptogram database may store seat assignments and other information that may be relevant for the event promoter.

At s230, a first validation cryptogram may be generated by the merchant validation server. In one embodiment, first validation cryptogram is generated by any combination of elements in the merchant subsystem 135, such as merchant validation server 134, or a merchant server 125, a host security module (HSM) 132. The first validation cryptogram may be based on event-specific, merchant, and portable consumer device information. Merchant information may include a merchant identification number (MID). The MID uniquely identifies the merchant, and may be a unique identification provided to the merchant by the electronic payment transaction acquiring entity.

At s240, the first validation cryptogram may be then stored in a validation cryptogram database (e.g., validation cryptogram database 136). The validation cryptogram database may be part of the merchant validation server or in operative communication with the merchant validation server. In one embodiment, the data contained in the validation cryptogram database is transferred to a venue validation terminal (e.g., point of validation terminals 140). In one embodiment, the validation cryptogram database (e.g., 136 or 144) is in operative communication with a venue validation terminal (e.g., as shown by arrows 4/7 and 8/10).

At s250, when the consumer wishes to enter the access-controlled event, the consumer presents their portable consumer device at a point of validation terminal. In one embodiment, a consumer swipes or scans there card at a turnstile. The point of validation terminal may be any of the devices shown, or described in relation, to FIG. 1. In one embodiment, the point of validation terminal reads portable consumer device information, such as a PAN, credit card number, expiration date, card verification value (e.g., CVV, dCW, CID), hardware identifier (e.g., SIM card number), or other suitable information that uniquely identifies the portable consumer device. In one embodiment, the point of validation terminal can be used to input portable consumer device information manually, by either the consumer or an agent.

At s260, a second validation cryptogram may be generated. The second validation cryptogram is generated in a similar manner to the first validation cryptogram. In one embodiment, the second validation cryptogram may be generated by the venue validation server (142). In one embodiment, the point of validation terminal generates the second validation cryptogram (140). In another embodiment, the second validation cryptogram is partially generated by the point of validation terminal and partially generated by the venue validation server.

At s270, the first validation cryptogram (generated at s230) and the second validation cryptogram (generated at s260) are compared with each other. As discussed above, the first validation cryptogram may be stored in a database that is in operative communication with the venue validation server or the merchant validation server. If the second validation cryptogram sufficiently matches the first validation cryptogram, then the process proceeds to S280. Otherwise, the process ends or returns to s250. In one embodiment, the comparison occurs on the point of validation terminal. In another embodiment, the comparison occurs on the venue validation server or the merchant validation server.

At s280, an access permissions message is generated. Either the point of validation terminal, venue validation terminal, and/or merchant validation terminal may generate this message or portions of this message, In one embodiment, the access permission message may contain an instruction to open a physical barrier (such as a gate or turnstile) coupled to the point of validation terminal. In one embodiment, a display on the point of validation terminal may display an access granted message to an usher, and the user may allow the appropriate number of people entry. The display may also show seating information, such as section, seat, and/or row number. In one embodiment, a printer is coupled to the point of validation terminal. The printer may print a receipt with seating information.

At s290, an attendance validation cryptogram may be generated. The attendance validation cryptogram is optional and may be used to securely store and transmit information about what tickets were actually used at the event, what gate was entered, the time of entry, etc. That is, the attendance validation cryptogram may be used to measure actual attendance or gate receipts. Optionally, at s295, the attendance validation cryptogram may be stored to an attendance validation cryptogram database and may be later used for audit purposes. In one embodiment, the attendance validation cryptogram is sent to the merchant for record keeping and reconciliation. In another embodiment, the attendance validation cryptogram is sent to the venue operator.

Validation Cryptogram Generation

Figure 3:
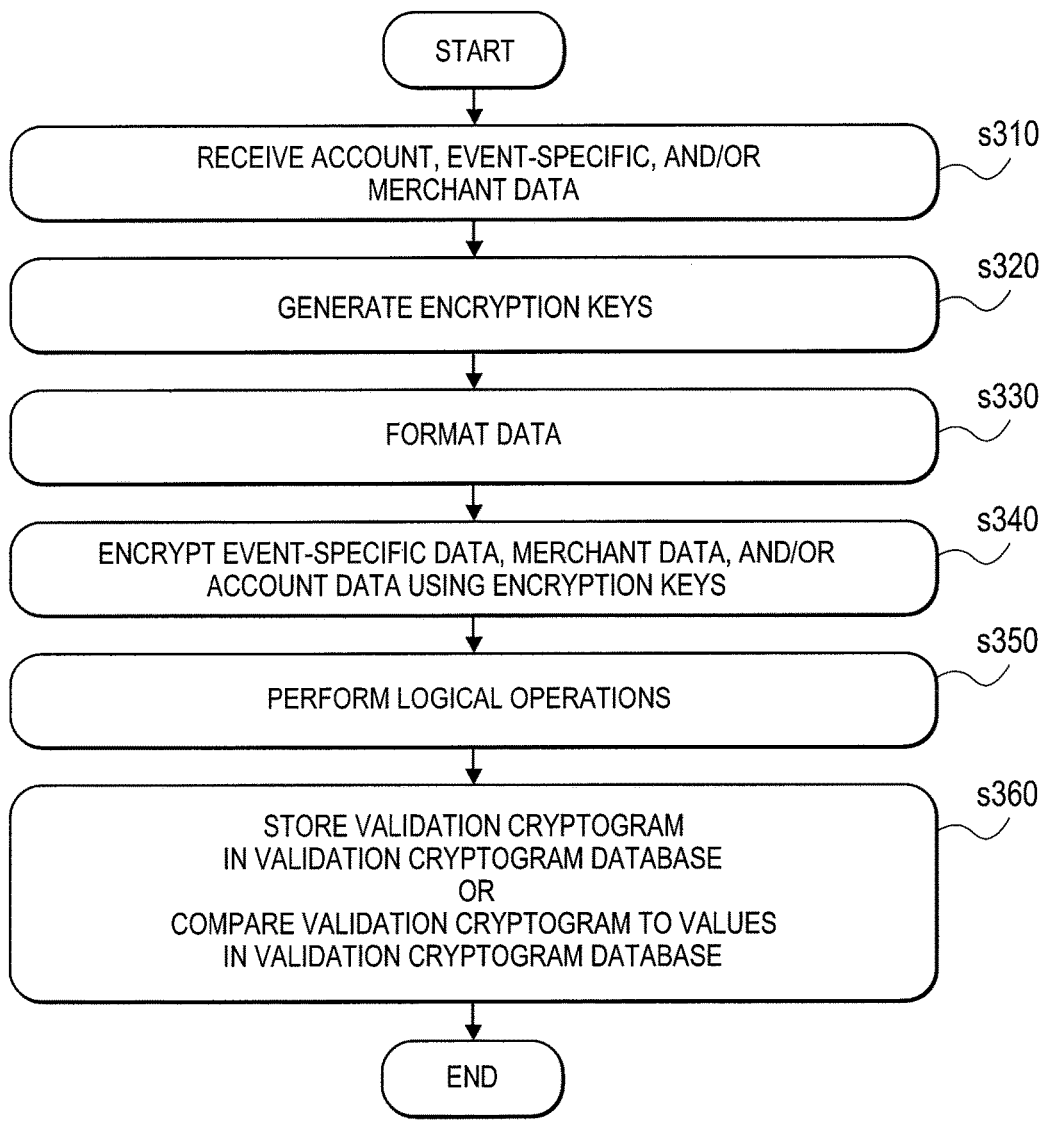
FIG. 3 shows a diagram of a method of generating and validating a cryptogram in accordance with an embodiment of the present invention.

FIG. 3 shows a high level diagram of a method for generating a validation cryptogram. At s310, a merchant validation server or a venue validation server receives account data, event-specific data, and/or merchant data. Account data may be a PAN, expiration date, verification value, etc. Event-specific data may be an event ID, event date, etc. Merchant data may include a merchant identifier. At s320, the merchant validation server generates encryption keys. In one embodiment, a host security module (HSM) is used to generate encryption keys. At s330, the account data, event-specific data, and/or merchant data may be formatted using logical operations, concatenation, etc.

At s340, the account, event-specific, and/or merchant data is encrypted using the encryption keys. Then, that combination may be encrypted with a key. At s350, logical operations (e.g., XOR) may be performed to combine data. S340 and s350 may be repeated for each type of input data (account, event-specific, and/or merchant data), and the encryption step may comprise a series of encryption steps, as described in further detail below. For example, account data may be encrypted using an encryption key, and the output of that encryption may be combined with event-specific data. At s360, the validation cryptogram is either (a) stored in a validation cryptogram database, if the cryptogram was generated as part of the purchase cycle, or (b) compared to values in a validation cryptogram database, if the cryptogram was generated as part of the validation cycle.

Figure 4:
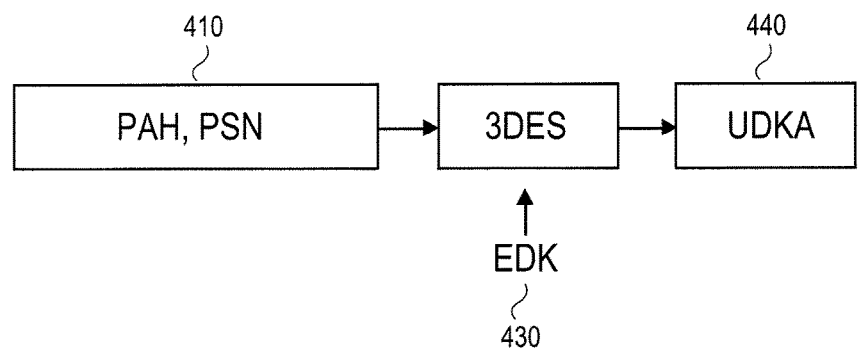
FIG. 4 shows a diagram of a method of generating keys in accordance with an embodiment of the present invention.
Figure 4:
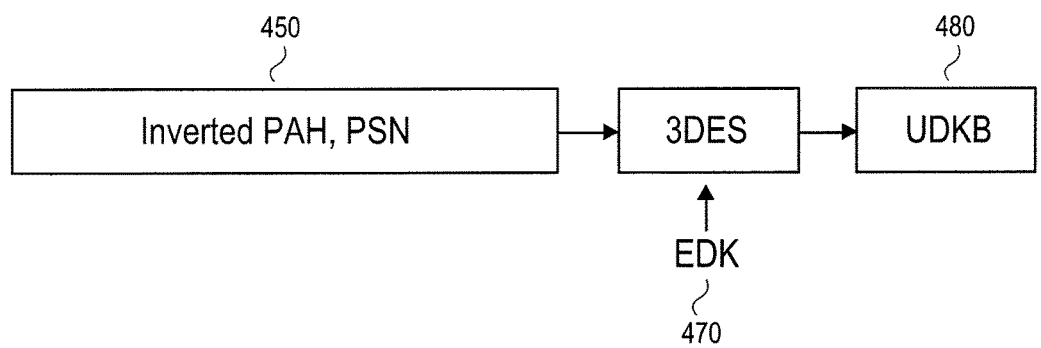
Figure 5:
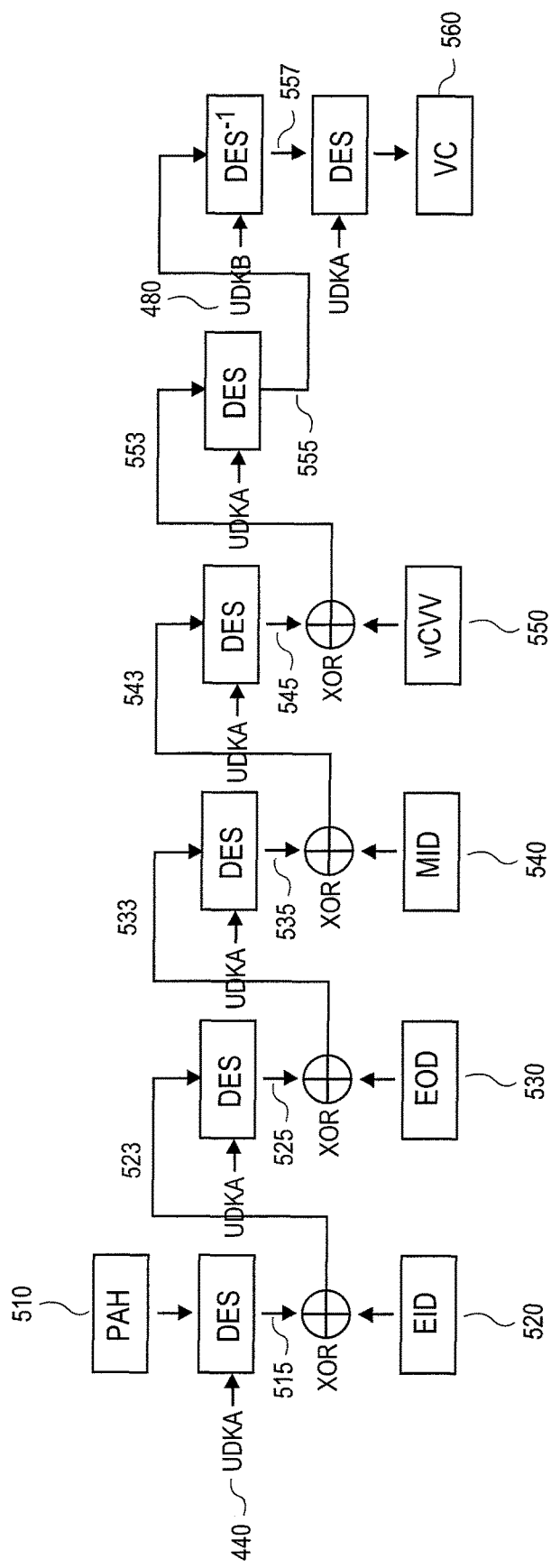
FIG. 5 shows a diagram of a series of inputs and operations for generating a cryptogram in accordance with an embodiment of the present invention.

FIGS. 4-5 show one exemplary embodiment of generating a validation cryptogram and unique keys for use in generating the validation cryptogram. Specifically, FIG. 4 shows one embodiment of a derivation of unique keys. Any suitable encryption algorithms may be used, such as DES, triple DES (3DES), AES, etc. Keys may be based on any suitable data. In the embodiment shown in FIG. 4, the derivation method of unique 3DES keys utilizes a primary account number (PAN), a primary account hash sequence number, and an event derivation key (EDK).

In one embodiment, the primary account number (PAN) is used as input to a hashing algorithm, such as the SHA-2 set of cryptographic hash functions. A hash function or algorithm is any well-defined procedure or mathematical function that converts a large, possibly variable-sized amount of data into a small datum. Hash functions may produce a fixed length output. For example, SHA-2 consists of a set of four hash functions with digests that are 224, 256, 384 or 512 bits (respectively, SHA-224, SHA-256, SHA-384, SHA-512), designed by the National Security Agency and published by the NIST as a U.S. Federal Information Processing Standard.

However, any suitable hashing functions may be used. Using a hash is desirable because it takes the PAN and changes it to a fixed length output. In one exemplary embodiment, SHA-256 may be used to generate a fixed length (256-bit) output.

In one embodiment, a primary account hash (PAH) may be calculated as follows:

$$PAH = (C \text{ Left 128 bit Block}) \text{ XOR } (C \text{ Right 128 bit Block})$$

Where C=SHA-256 (Primary Account Number)

Any suitable representative of the PAN may be used, as it is beneficial to obscure the PAN for security reasons.

A primary account hash sequence number (PSN) may be used to differentiate a primary card from an additional card on the same account. In some embodiments, the PSN is set to "00" for the purposes o the key derivation method described herein.

An event derivation key (EDK) is a cryptographic salt value (i.e., a random number used as input in a key derivation function). The EDK may be generated by an MVS HSM and used in the validation cryptogram calculation. The EDK may be unique per event. That is, each event may have an event-specific key. In one embodiment, the EDK is generated by an MVS HSM internal random number generator. In one embodiment, the EDK is a 32-byte cryptographic salt value. Once generated, the EDK may take part in the validation cryptogram calculation. The EDK may be securely stored into the point of validation terminal (PVT) internal crypto-processor memory prior to the event start. This secure storage may be accomplished through an initialization transaction when the PVT would download all necessary configuration parameters from the MVS and/or from the venue validation server (VVS). The EDK may come from the HSM through the MVS.

Two keys, UDKA 440 and UDKB 480, may be derived from the EDK 430/470, PAH, and PSN. To generate UDKA 440, as shown in FIG. 4, the PAH and PSN may be concatenated or otherwise combined (410). The combined PAH-PSN may be encrypted using 3DES and the EDK 430. The output of the 3DES encryption algorithm is UDKA 440. To generate UDKB, the bits of the PAN may be inverted and concatenated with the PSN (450). The combined inverted PAN-PSN may be encrypted using 3DES and the EDK 470, which may be the same as EDK 430. The output of the 3DES encryption algorithm is UDKB 480.

In other embodiments, the derivation of UDKA 440 and UDKB 480 from the EDK 430/470 may take any form, including assigning the value of the leftmost half of the EDK to UDKA 440, and assigning the value of the rightmost half of the EDK to UDKB 480. Alternatively, the UDKA 440 may be derived by selecting alternating or other predetermined bit sequences from the EDK while the remaining bits are assigned to UDKB 480. Furthermore, there is no requirement that UDKA and UDKB are of equal length.

UDKA 440 and UDKB 480 may then be used in the cryptogram generation shown in FIG. 5. Cryptogram inputs may be used to generate a validation cryptogram 560. Cryptogram inputs may include account information (PAN, PAH, expiration date, verification value), event information (event identifier, event original date), transaction-specific data, and/or merchant information (merchant identifier). FIG. 5 shows one exemplary embodiment; the cryptogram inputs, encryption order, and logical operations performed may vary without departing from the scope of the disclosure.

Primary account hash (PAH) 510 may be derived from a primary account number (PAN), as described above. The PAH 510 may be any suitable length, and is preferably 256 bits when SHA-256 is used. Using UDKA 440 as an encryption key and DES (or other suitable encryption), the PAH 510 is encrypted to generated a first encrypted output 515.

A logical operation is then performed on the first encrypted output 515. In one embodiment, the logical operation is an exclusive-or operation (XOR) with the event identifier (EID) 520. The result is first XOR output 523. The first encrypted output 515 and the EID 520 may be the same length or different lengths. In the event that the lengths are different, zeros may be added to pad the beginning or end of the shorter of the first encrypted output 515 or EID 520.

The first XOR output 523 is encrypted using UDKA 440 as the encryption key and DES to produce a second encryption output 525. A second exclusive-or operation is performed on the second encryption output 525 with an event original date (EOD) 530. In some embodiments, other date information may be used. Again, zeros may be added to pad the shorter of the two inputs to the exclusive-or operation. The result is second XOR output 533.

The second XOR output 533 is encrypted using UDKA 440 as the encryption key and DES to produce a third encryption output 535. An third exclusive-or operation is performed on the third encryption output 535 with merchant identifier (MID) 540. In some embodiments, other merchant information may be used (e.g., merchant phone number, address, tax ID). The result is third XOR output 543.

The third XOR output 543 is encrypted using UDKA 440 as the encryption key and DES to produce a fourth encryption output 545. A fourth exclusive-or operation is performed on the fourth encryption output 545 with a validation card validation value (vCVV) 550, which is described in more detail below. The result is a fourth XOR output 553.

The fourth XOR output 553 is encrypted using UDKA 440 as the encryption key and DES to produce a fifth encryption output 555. The fifth encryption output 555 is "decrypted" using UDKB 480 and reverse-DES ($DES^{-1}$) to generate decrypted output 557. The decrypted output 557 is then encrypted using UDKA 440 and DES to produce a validation cryptogram (VC) 560.

It should be noted that any of the steps described in FIG. 5 could be performed in any order. Furthermore, the length of inputs to any encryption or logical operation step (e.g., PAH, EID, EOD, MIC, vCVV, etc.) may be any suitable length. Zeros may pad any input that is shorter. While DES and $DES^{-1}$ are shown, it is appreciated that any suitable encryption/decryption algorithm may be used. Similarly, while an exclusive-or logical operation (XOR) is shown, it is appreciated that other logical operations may also suffice (AND, OR, NOR, XNOR, NAND, etc.). Furthermore, instead of an exclusive-or operation for combining any two values, concatenation may be used. Concatenation may be used in combination with a logical operation.

It should also be noted that additional data may be encrypted and comprise the validation cryptogram. For example, a transaction specific number from the merchant or payment network may used to generate a validation cryptogram. In one embodiment, the transaction specific number is an authorization code from a payment processing network. The authorization code may be encrypted and XOR'ed with any of the above. In one embodiment, an authorization code might replace vCVV (550), MID (540), or any other suitable input. Additionally, partial cryptograms and/or multiple cryptograms may be generated by the merchant validation server and stored to the cryptogram validation database. For example, a first partial cryptogram may be generated using account and event-specific information. The first partial cryptogram may then be used to generate a second cryptogram by encrypting the first partial cryptogram and combining the results (e.g., performing a logical operating or concatenation) of the first partial cryptogram with an authorization code, for example. The validation cryptogram database then stores both the first partial cryptogram and the second (full) cryptogram for later computation and comparison.

Cryptograms may be partially generated by a point of validation terminal and partially by a venue validation server. Benefits to this embodiment are that more sensitive data may be stored only on the venue validation server, rather than on point of validation terminals which may be numerous. For example, there may be dozens or even hundreds of point of validation terminals at a given event. It would be more secure to store more sensitive data only on a centralized server, instead of on the point of validation terminals, which may be easily lost, misplaced, or stolen.

In another embodiment, a first hash value is generated when the consumer buys a ticket and a second hash value is generated when the consumer swipes his card at the event gate. If the first and second hash values match, the consumer is allowed into the venue. The hash values are calculated based on the card number and expiration date, merchant ID, event data (event, location, date, time, etc.) and a transaction specific authorization number. Transaction specific input data is desirable because it makes the transaction more secure.

Hashes may be calculated by ticket hash module. The hash module comprises a computer-readable medium, including code executable by a processor, for generating a hash output. In one embodiment, the Secure Hash Algorithm (e.g., SHA-256) is implemented on the computer-readable medium; however, any suitable algorithm can be used to create the hash. After the hash values associated with each ticket purchase are calculated they are stored in a validation hash database. It can be more secure and beneficial to generate the hash on the validation hash database because the distribution of sensitive information, such as credit card number and expiration date, etc., is limited.

Multiple hash values may be created by ticket hash module. In one embodiment, a first hash is calculated using a merchant ID, location ID, event ID, event date, and an authorization code for the transaction. The authorization code may be transaction specific. The location ID, event ID and event date may be event specific. The merchant ID may be merchant or merchant location specific. A second hash is calculated using information associated with a portable consumer device, such as the PAN, credit card number and expiration date. In one embodiment, a second hash is calculated using the first hash in combination with information associated with a portable consumer device, such as the PAN, credit card number and expiration date. In one embodiment, the second hash is derived from the first hash. Therefore, a first hash and a second hash value are created and associated with each ticket purchase transaction by consumers using their portable consumer devices. The first hash and second hash values for each ticket purchase transaction are stored on ticket server in a table or other suitable format for retrieval and comparison.

The ticket server may be communicatively coupled to an event server by a network. Alternatively, information from the ticket server is sent or downloaded to the event server. In one embodiment the information from the ticket server is sent or downloaded to the event server before the audience or spectators are permitted to enter the event. In another embodiment, the ticket server and the event server are the same server or system of servers. The event server may be located at the venue where the event is located, or it may be offsite but communicatively coupled to a computer system at the venue.

In one embodiment, the information sent to event server comprises hash values associated with ticket purchase transactions. The hash values may be stored in a table or any other format where the hash values associated with each transaction can be identified by a computer. When a consumer scans his or her portable consumer device at the event gate reader, the portable consumer device is authenticated and validated against information stored at the server. The portable consumer device is authenticated by generating a hash value and comparing it against the hash value generated by the ticket server. An event hash (i.e., a hash that is generated at the event for comparison and validation purposes) may be generated using a hash module. If the hash generated at the event server by the hash module corresponds to a hash generated by ticket server, the consumer is allowed entry into the event.

In one embodiment, the hashes generated by the hash module on the ticket server are transferred to the event gate reader. The event gate reader may include the hash module. When the portable consumer device is scanned at the event gate reader, the hash module generates a hash value based on the portable consumer device and other information. The event gate reader compares it to the hash value stored on the event gate reader, which was generated by the hash module when the consumer bought tickets at the purchase terminal. If the hash generated at the event gate reader corresponds to a hash generated by ticket server, the consumer is allowed entry into the event. A hash value may be different than an encrypted value in that a hash function does not necessarily use an encryption process, whereas an encrypted value is generated using encryption, usually with a key. A hash function may be a one-way function, whereas encryption is typically a two-way function (e.g., encrypt plain text and decrypt cipher text).

Attendance Validation Cryptogram

In one embodiment, an attendance validation cryptogram is generated (e.g., s290 in FIG. 2). An attendance validation cryptogram (AVC) is a cryptographic hash token value generated by a PVT at the venue point of entry, which confirms that a PVC was validated and access was granted at a specific PVT at a given date and time and that a cardholder device with the same account number used during the original ticket purchase transaction was presented and read. A database of PACs can be sent to the merchant for audit and dispute resolution support purposes.

The attendance validation cryptogram may be generated using a hash or encryption algorithm based on a variety of inputs. In embodiments of the present invention, any combination of the validation cryptogram, PVT identifier, and time/date stamp may be used.

In one embodiment, the attendance validation cryptogram is generated as follows:

AVC=SHA-256 (VC, PVT Electronic Serial Number, PVT RTC Validation Time Stamp)

where PVT RTC Validation Time Stamp Format=Fyyyymmddhhmmss0 (Padded with an F to the left and a Zero to the right).

In one embodiment, a Real Time Clock (RTC) is used to generate a time stamp. An RTC may be a feature of programmable embedded devices, such as POS terminals and point of validation terminals. The RTC allows the terminal to keep an internal clock working based on an internal rechargeable battery. It should be noted that the attendance validation cryptogram may be generated using other values and data formats.

Validation Card Verification Value

Validation Card Verification Value (vCVV) is a card account number validation cryptogram that may be used in the validation cryptogram generation. The vCVV may be calculated using the Dynamic CVV Algorithm and the Key Derivation Methodology similar to those used for chip cards.

The validation card validation value (vCVV) may be calculated using the following inputs:

$$PAH = C \text{ Left 128 bit Block XOR } C \text{ Right 128 bit Block}$$

Where: C=SHA-256 (Primary Account Number)
Where PAH Sequence Number (PSN)="00"
Where Service Code="999"
Z=Inverted (Card Expiration Date)
Where: Card Expiration Date is formatted as "yymm"
Algorithm for Generating the Validation Card Validation Value (vCVV):
1. Construct a string by replacing the leftmost four digits of the PAH with the Z=Inverted (Card Expiration Date), this will be referred to as the Altered PAH in subsequent steps.
2. Construct a string of bits by concatenating, from left to right, the following data: Altered PAH Card Expiration Date formatted as: "yymm" Service Code="999"
3. Place the result of Step 2 into a 128-bit field, right-filling the remaining bits with binary zeros.
4. Split the 128-bit field into two 64-bit blocks, the leftmost 64 bits are Block A, and the rightmost 64 bits are Block B.
5. Using DES, encrypt Block A with UDKA, this results in Block C.
6. Exclusive-OR (XOR) Block C with Block B, this result in Block D.
7. Using DES, encrypt Block D with UDKA, giving Block E.
8. Using DES-1, decrypt Block E with UDKB, giving Block F.
9. Using DES, encrypt Block F with UDKA, giving Block G.
10. Use Block G and, beginning with the leftmost digit, extract all the digits from 0 through 9, left justify these digits in a 64-bit field, giving Block H.
11. Use Block G and, beginning with the leftmost digit, extract the hexadecimal digits from A to F, then convert each extracted digit to a decimal digit by subtracting 10, giving Block I.
12. Concatenate Block I to the right of Block H.
13. Select the three leftmost digits, these digits are the vCVV.

Exemplary Merchant Validation Server

Figure 6:
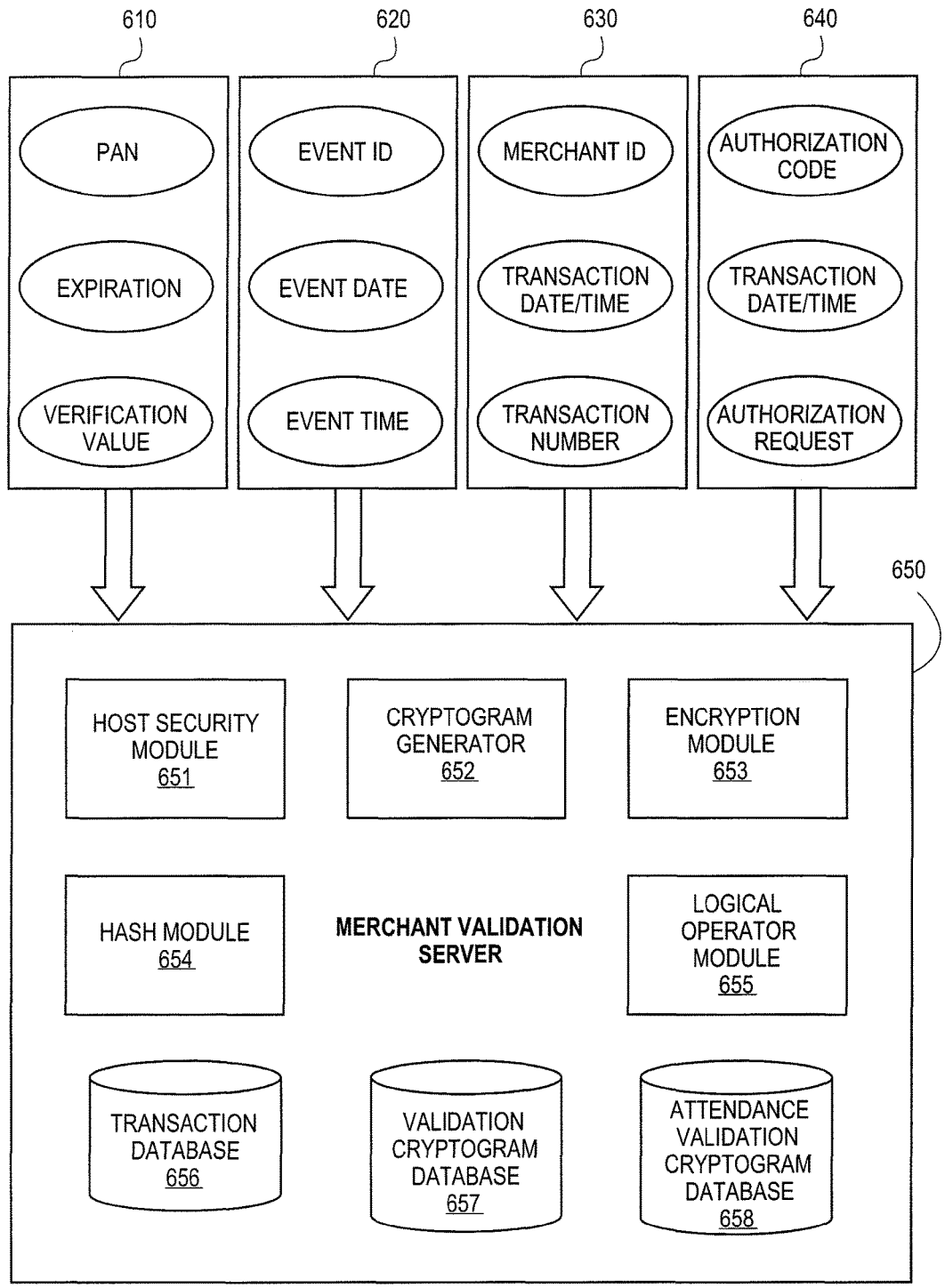
FIG. 6 shows a block diagram of a merchant validation server in accordance with an embodiment of the present invention.

FIG. 6 illustrates a block diagram of a server for generating validation cryptograms. Though a merchant validation server 650 is shown, it is appreciated that the merchant validation server 650 could be a venue validation server. The merchant validation server 650 generates a validation cryptogram during or after the original purchase transaction and stores the validation cryptogram into a validation cryptogram database 657. A venue validation server may later recreate the validation cryptogram in a similar manner for comparison purposes.

Inputs to the merchant validation server may include account information 610, event information 620, merchant information 630, and/or payment network information 640. Account information 610 may include information about an account associated with a consumer and maintained by an issuer. Account information 610 may include information about a portable consumer device that is associated with the account. For example, account information 610 may include a primary account number (PAN), credit/debit card number, expiration date, card verification value (e.g., CVV, dCVV, CID), hardware identifier (e.g., SIM card number), or other suitable information that uniquely identifies the portable consumer device or the account.

Event information 620 may include information that uniquely identifies an event and/or its date/time, such as an event identifier (EID), event date, original event date, event time, or other information that describes the event. Event information may also comprise event options, such as the number of tickets to purchase, the seating location, or special add-ons (concessions, souvenirs, etc.).

Merchant information 630 may include a merchant identification number (MID). The MID uniquely identifies the merchant and may be a unique identification provided to the merchant by the electronic payment transaction acquiring entity. MID may be assigned by an acquirer, event promoter, or a third-party entity providing the ticketing solution as a service to multiple ticketing sales organizations and event promoters. In some embodiments, there could be other merchant-type fields involved.

Payment network data 640 includes data that is provided by a payment processing network. In one embodiment, payment network data 640 may include, but is not limited to, an authorization code, authorization request message, authorization response message, or transaction time/date.

The payment processing network may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 130 may include a server computer. A server computer is typically a powerful computer or cluster of computers. For example, the server computer can be a large mainframe, a minicomputer cluster, or a group of server computers functioning as a unit. In one example, the server computer may be a database server computer coupled to a Web server computer. The payment processing network 130 may use any suitable wired or wireless network, including the Internet.

Merchant validation server 650 may comprise one or more of the following: host security module (HSM) 651, cryptogram generator 652, encryption module 653, hash module 654, logical operator module 655, transaction database 656, validation cryptogram database 657, and/or attendance validation cryptogram database 658. Each of these elements may be in operative communication with one another through a series of communication buses (not shown). MVS 650 may include any of the elements shown in FIG. 8.

The merchant validation server (MVS) may include one or more host security modules (HSM) 651 running specialized applications. The HSM 651 may be a NIST (FIPS-140)

approved tamper resistant security appliance used for the acceleration of cryptographic algorithms necessary to implement the validation cryptogram calculation. The HSM may also be used for the secure key generation, storage, and distribution management of security keys, such as an event derivation key. One or more of the modules shown may include a random number generator and/or key generator for generating random numbers and encryption keys. Random numbers generated may be used as a cryptographic salt value (i.e., as input in a key derivation function).

A hardware security module may be a type of secure cryptoprocessor that can manage digital keys, accelerate cryptoprocesses, and provide for strong authentication to access critical keys for server applications. These modules may be internal or external hardware devices that can be directly attached to, or contained within, a server or general purpose computer. HSMs may have the following capabilities: onboard secure generation, onboard secure storage, use of cryptographic and sensitive data material, offloading application servers for complete asymmetric and symmetric cryptography. HSMs may provide both logical and physical protection of these materials from unauthorized use. Data contained in an HSM may include asymmetric key pairs (and certificates) used in public-key cryptography, symmetric keys, and other data. HSMs may have hardware cryptographic accelerators.

The cryptogram generator 652 may generate validation cryptograms as described herein. For example, the cryptogram generator 652 may perform all or parts of s230 in FIG. 2 or the calculations shown in FIGS. 4 and 5. In one embodiment, the cryptogram generator 652 operates in conjunction with the encryption module 653. The encryption module 653 may perform the encryption described herein, including but not limited to s340 in FIG. 3, 3DES blocks in FIG. 4, and DES blocks in FIG. 5. In one embodiment, the cryptogram generator 652 operates in conjunction with the hash module 654. For example, various hash value calculations may be performed, as described above. The hash module 654 may perform these operations. Similarly, logical operations, described above, may need to be performed—for example, the exclusive-or and concatenation operations described with respect to FIGS. 4-5 and s350 in FIG. 3. The logical operator module 655 may perform these operations.

The validation cryptogram database 657 stores a list of valid cryptograms. The database may be linked or otherwise associated with access permission, including the number of paid for admissions or location of seats. The transaction database 656 stores information associated with transaction such as a transaction history. The attendance validation cryptogram database 658 may store attendance validation cryptograms that may be used to measure actual attendance or gate receipts.

It is appreciated that merchant validation server 650 and venue validation server (not shown) may include any number of hardware and software elements, including those described herein and with respect to FIG. 8, below.

Exemplary Point of Validation Terminal

Figure 7:
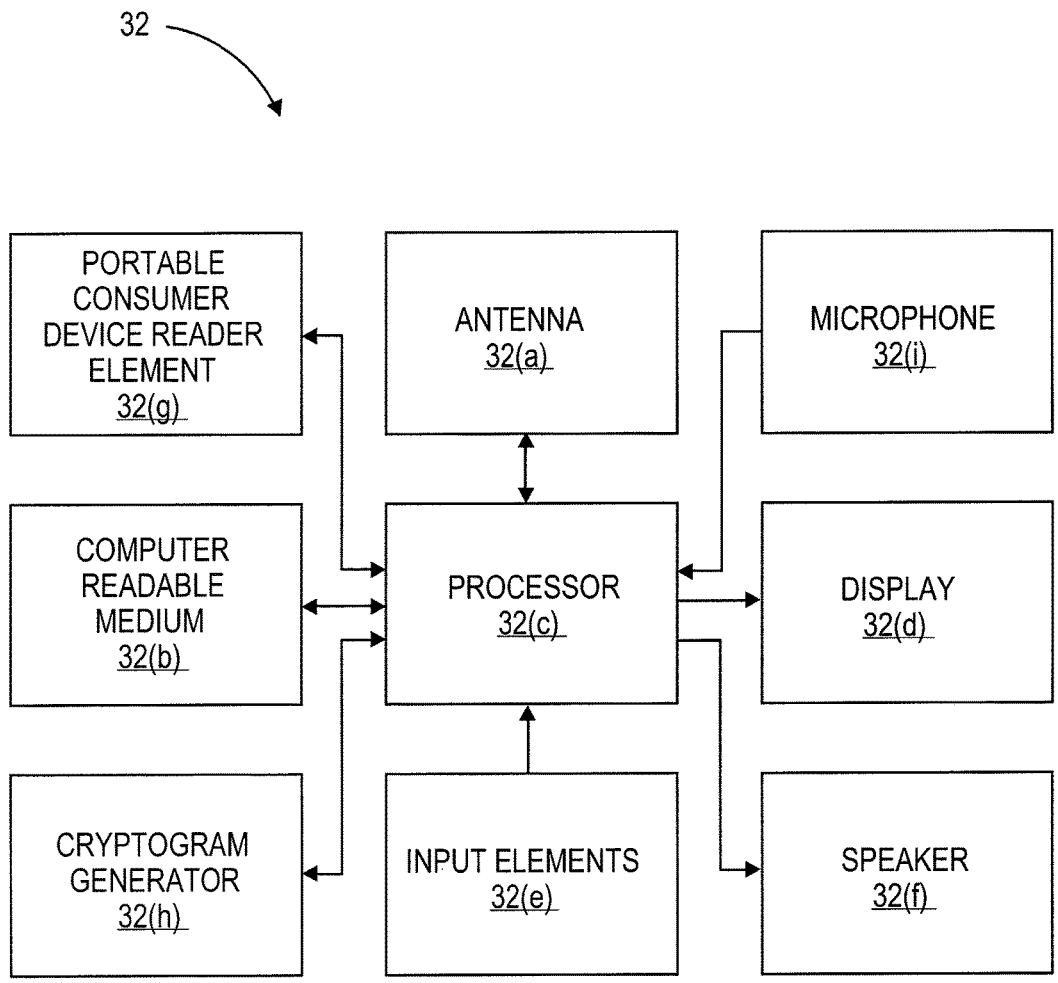
FIG. 7 shows a block diagram of a point of validation terminal in accordance with an embodiment of the present invention.

In FIG. 7, a point of validation terminal 32 may comprise a computer-readable medium and a body. FIG. 7 shows exemplary components of a point of validation terminal, such as the PVTs shown in FIG. 1 (140). (FIG. 8 shows a number of components, and the mobile devices according to embodiments of the invention may comprise any suitable combination or subset of such components.) The computer-readable medium 32(b) may be present within the body (not shown), or may be detachable from it. The body may be in the form a plastic substrate, housing, or other structure. The computer-readable medium 32(b) may be a memory that stores data and may be in any suitable form including a magnetic stripe, a memory chip, uniquely derived keys, encryption algorithms, etc. In one embodiment, the computer-readable medium 32(b) includes a validation cryptogram database that contains valid cryptograms, which may be associated with access permissions. Access permission may include a number of people to admit, section/room/seat identifiers, or other information describing the level of access that a consumer is entitled to.

In one embodiment, in stadiums with an exclusive sector for consumers who use the disclosed technology, those who use their portable consumer devices are able to enter through a specific turnstile, shortening their wait time. Additionally, these consumers may have pre-assigned seats. These seats can be differentiated from the general admission seats, which require waiting in line. Additionally, these pre-assigned seats may be located in a more desirable section of the stadium. There may be special access clubs for these consumers.

The point of validation terminal 32 may further include a portable consumer device reader element 32(g). The portable consumer device reader element 32(g) may comprise a magnetic stripe reader, contactless reader, smart card reader, or the like. Portable consumer device reader element 32(g) may be capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth, infra-red, or other data transfer capability that can be used to exchange data between the point of validation terminal 32 and an interrogation device. Thus, the point of validation terminal 32 is capable of communicating and transferring data and/or control instructions via both a cellular network and a near field communications line or network. The point of validation terminal 32 may be implemented in the form of a semiconductor chip (or other data storage element) with an associated wireless transfer (e.g., data transmission) element, such as an antenna.

The point of validation terminal 32 may also include a processor 32(c) (e.g., a microprocessor) for processing the functions of the point of validation terminal 32 and a display 32(d) to allow a user to see phone numbers and other information and messages. The point of validation terminal 32 may further include input elements 32(e) to allow a user to input information into the device, a speaker 32(f) to allow the user to hear voice communication, audio tones, music, etc., and a microphone 32(i) to allow the user to transmit her voice through the mobile device 32. The mobile device 32 may also include an communication port 32(a) for wireless data transfer (e.g., data transmission), such as an antenna.

The point of validation terminal 32 may also include a cryptogram generator 32(h), which can generate validation cryptograms as described herein. For example, cryptogram generator 32(h), alone or in combination with other components, may generate a validation cryptogram as part of the validation cycle (e.g., s260-290 in FIG. 2, s310-s360 in FIG. 3). The cryptogram generator 32(h) may contain, or be in operative communication with, a validation cryptogram database that contains valid cryptograms, which may be associated with access permissions.

The one or more point of validation terminals (PVTs) 140 may be compliant with EMVCo, PCI DSS and PCI PA-DSS specifications and requirements. PVT 140 may be used to read portable consumer devices (credit cards, debit cards, smart cards, mobile devices, keychain fobs, etc.) at a venue point of entry. In one embodiment, the PVT 140 may calculate the PVC value at a venue point of entry. In one embodiment, a copy of the validation cryptogram database (which contains valid validation cryptogram values) is stored locally on the PVT 140. Advantages to this embodiments include that the PVT 140 can execute a stand-alone and offline internal validation of the validation cryptogram value.

In another embodiment, the PVT 140 communicates with a VVS and/or an MVS, which will then validate the PVC value calculated by the PVT against a database of valid PVC values originally generated by an MVS during the original purchase payment transaction processing. In other embodiments, the PVT 140 calculates a partial cryptogram and sends it to the VVS and/or MVS for further calculation and approval.

Point of validation terminal may be in operative communication with the venue validation server. In one embodiment, the communication protocol to be used between the point of validation terminal (PVT) and the venue validation terminal (VVS) or merchant validation server (MVS) may be TCP/IP and SSLv3/TLS1.0. Session resumption may be limited to 24 hours. AES-128 encryption based on the PDK may be used to protect the data field contents of all transactions except for the logon, during which the Diffie-Hellman Key Agreement Method may be performed to synchronize the PCT derication key (PDK) between the PVT and the VVS or MVS.

In one embodiment, communications between a point of validation terminal (PVT) and a merchant validation server (MVS) and/or a venue validation server (VVS) may be secured using encryption. In one embodiment, a PVT derivation key (PDK) is used to protect communications between a PVT and a VVS and/or MVS. AES-128 encryption may be used to encrypt communications using the PVT derivation key. In one embodiment, when a PVT is powered up, the PVT and the VVS and/or MVS are synchronized via a logon transaction using the Diffie-Hellman Key Agreement Method.

In one embodiment, an extensible mark-up language with syntax, such as XML, may be used for the communications between the point of validation terminal and the venue validation terminal. XML may be used for various communications/transactions, including but not limited to a secure log in a transaction where the point of validation terminal logs onto the venue validation server to initiate communication, a key exchange transaction to ensure all communications between point of validation terminal and venue validation terminal are secure, and a ticket authentication transaction to determine whether a portable consumer device is associated with a paid admission.

Presented below are the transactions specifications for the implementation of a VVS or MVS based solution, which can use file exchange or direct socket connection between the PVT and the VVS or MVS.

In one embodiment, PDK=H Left 128 bit Block XOR H Right 128 bit Block, where: H=SHA-256 (X), and X=(PVT Electronic Serial Number) XOR (PVT RTC Power-Up Time Stamp) PVT Electronic Serial Number may be padded with Zeroes to the left PVT RTC Power-up Time Stamp Format=Fyyyymmddhhmmss0 (Padded with an F to the left and a Zero to the right).

Figure 8:
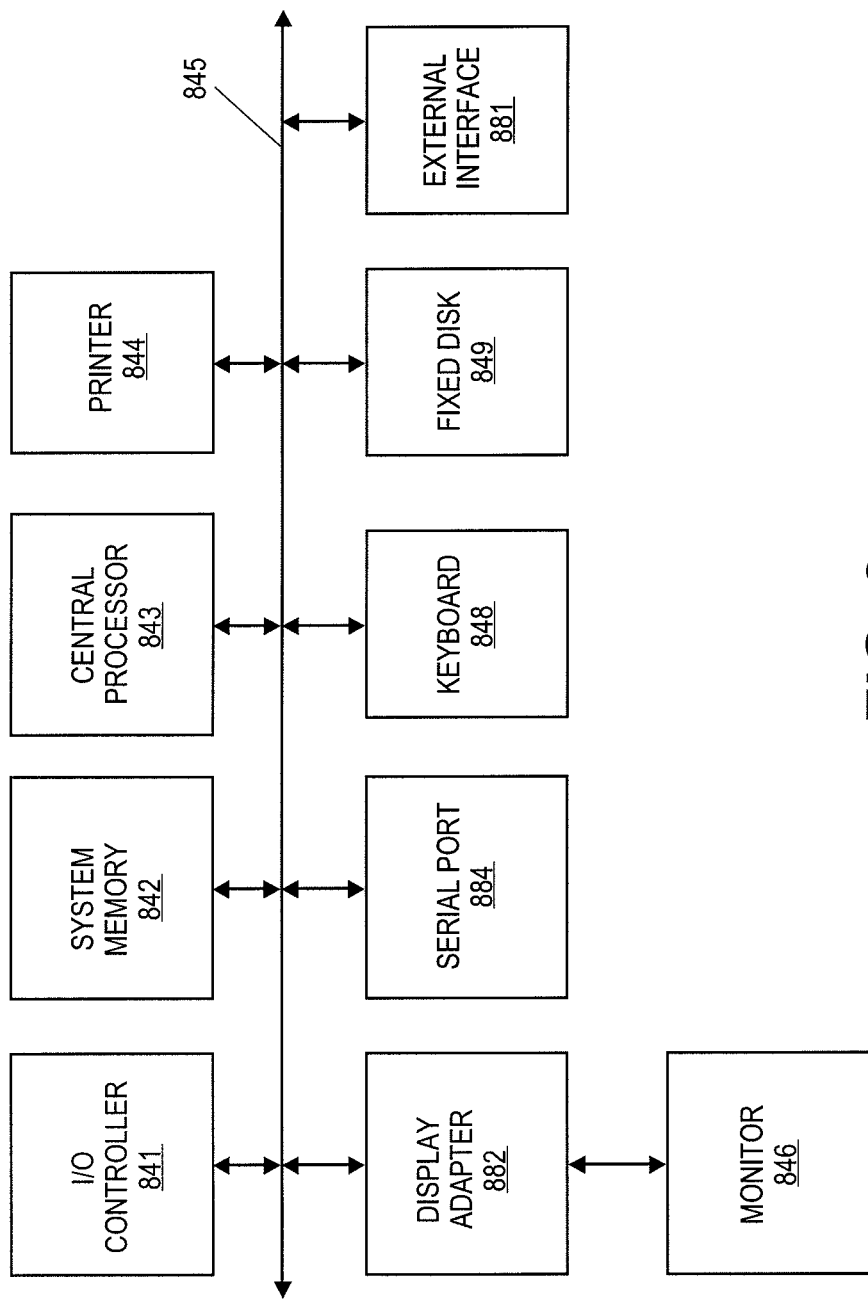
FIG. 8 shows a high level block diagram of a computer system that may be used to implement a server or a terminal accordance to an embodiment of the technology.

FIG. 8 is a high level block diagram of a computer system that may be used to implement any of the entities or components described above (e.g., merchant validation server, venue validation server, and point of validation terminal, etc.). The subsystems shown in FIG. 8 are interconnected via a system bus 845. Additional subsystems such as a printer 844, keyboard 848, fixed disk 849, monitor 846, which is coupled to display adapter 882, and others are shown. Peripherals and input/output (I/O) devices, which couple to I/O controller 841, can be connected to the computer system by any number of means known in the art, such as serial port 884. For example, serial port 884 or external interface 881 can be used to connect the computer apparatus to a wide area network such as the Internet, a mouse input device, or a scanner. The interconnection via system bus 845 allows the central processor 843 to communicate with each subsystem and to control the execution of instructions from system memory 842 or the fixed disk 849, as well as the exchange of information between subsystems. The system memory 842 and/or the fixed disk 849 may embody a computer-readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

One or more features from any embodiment may be combined with one or more features of any other embodiment without departing from the scope of the technology.

A recitation of "a", "an" or "the" is intended to mean "one or more" unless specifically indicated to the contrary.

It should be understood that the present technology as described above can be implemented in the form of control logic using computer software in a modular or integrated manner. Based on the disclosure and teachings provided herein, a person of ordinary skill in the art will know and appreciate other ways and/or methods to implement the present technology using hardware and a combination of hardware and software.

What is claimed is:

1. A method comprising:
   receiving, at a point of validation terminal, account information associated with a portable consumer device of a user seeking to access an access controlled event of a plurality of access controlled events;
   generating, by a processor provided in communication with the point of validation terminal, a validation cryptogram, wherein generating the validation cryptogram includes:
   inputting the account information to a hashing algorithm to generate a primary account hash;
   retrieving an event derivation key, wherein the event derivation key is specific to the access controlled event and is different for each access controlled event of the plurality of access controlled events, and wherein the event derivation key is randomly generated;

deriving a unique derived key from the event derivation key and the primary account hash;

encrypting the primary account hash with the unique derived key to generate an encrypted output;

performing one or more logical operations comprising one or more exclusive-or operations on the encrypted output and event-specific data associated with the access controlled event to generate a logical output; and encrypting the logical output with the unique derived key, thereafter forming the validation cryptogram;

accessing, by the processor provided in communication with the point of validation terminal, a validation cryptogram database that includes a plurality of stored validation cryptograms that were previously generated when users purchased permission to access the access controlled event;

verifying, by the processor provided in communication with the point of validation terminal, that the generated validation cryptogram matches one of a plurality of stored validation cryptograms that was previously generated when the user purchased permission to access the access controlled event; and opening a physical barrier to permit, by the point of validation terminal, the user to access the access controlled event only after the generated validation cryptogram is verified to match one of the stored validation cryptograms.

2. The method of claim 1, wherein the validation cryptogram and the stored validation cryptograms are generated using a cryptogram generator that includes an encryption module for encrypting data in accordance with the Data Encryption Standard (DES).

3. The method of claim 1, wherein the portable consumer device is a credit or debit card with a magnetic stripe.

4. A point of validation terminal comprising:
a processor;
a physical barrier; and
a non-transitory computer-readable medium coupled to the processor, including code that is executable by a processor, for implementing a method comprising:
receiving account information associated with a portable consumer device at an input of the point of validation terminal, wherein the point of validation terminal is used to validate access permissions that are associated with an access controlled event of a plurality of access controlled events;
generating a validation cryptogram, wherein generating the validation cryptogram includes:
inputting the account information to a hashing algorithm to generate a primary account hash;
retrieving an event derivation key, wherein the event derivation key is specific to the access controlled event and is different for each access controlled event of the plurality of access controlled events, and wherein the event derivation key is randomly generated;
deriving a unique derived key from the event derivation key and the primary account hash;
encrypting the primary account hash with the unique derived key to generate an encrypted output;
performing one or more logical operations comprising one or more exclusive-or operations on the encrypted output and event-specific data associated with the access controlled event to generate a logical output; and
encrypting the logical output with the unique derived key, thereafter forming the validation cryptogram;
accessing a validation cryptogram database that includes a plurality of stored validation cryptograms that were previously generated when users purchased permission to access the access controlled event;
verifying that the generated validation cryptogram matches one of a plurality of stored validation cryptograms that was previously generated when a user purchased permission to access the access controlled event; and
displaying an access permissions message after the validation cryptogram is verified to match one of the stored validation cryptograms; and
manipulating the physical barrier in response to the validation cryptogram being verified.

5. The point of validation terminal of claim 4, wherein the generating of the validation cryptogram includes sending the account information associated with the portable consumer device to a remote validation server or a venue validation server.

6. The point of validation terminal of claim 4, wherein the generating of the validation cryptogram includes encryption of the account information and the event-specific data.

7. The point of validation terminal of claim 4, wherein accessing the validation cryptogram database and verifying the generated validation cryptogram includes communicating with a venue validation server or a remote validation server.

8. The point of validation terminal of claim 4 wherein the validation cryptogram database is coupled to the processor.

9. The method of claim 1, wherein the event-specific data comprises an event identifier.

10. The point of validation terminal of claim 4, wherein the physical barrier is a turnstile.

11. The method of claim 1, wherein a display on the point of validation terminal is configured to display an access permissions message.

12. The method of claim 11, wherein the display is further configured to display seating information.

13. The point of validation terminal of claim 4 further comprising:
a printer unit coupled to the processor, wherein the printer unit is configured to print seating information.

14. The method of claim 1, wherein the processor provided in communication with the point of validation terminal is contained in a server separate from the point of validation terminal.

15. The method of claim 14, wherein the server is located at a venue where the access controlled event occurs.

16. The method of claim 1, wherein the processor provided in communication with the point of validation terminal is contained in the point of validation terminal.

17. The method of claim 1, wherein the processor provided in communication with the point of validation terminal transmits to the point of validation terminal an access permissions message if the validation cryptogram is determined to be acceptable.

18. A point of validation terminal, comprising:
a portable consumer device reader for obtaining account information from a portable consumer device of a user seeking to access an event of a plurality of events;
a physical barrier;

a processor communicatively coupled to a validation cryptogram database that contains a plurality of stored validation cryptograms, each generated when a user purchased a ticket to an event; and a memory device including instructions that, when executed by the processor, cause the processor to, at least:

responsive to the portable consumer device reader obtaining account information from a portable consumer device of a user seeking to access the event, generate a validation cryptogram, wherein generating the validation cryptogram includes:

inputting the account information to a hashing algorithm to generate a primary account hash;

retrieving an event derivation key, wherein the event derivation key is specific to the event and is different for each event of the plurality of events, and wherein the event derivation key is randomly generated;

deriving a unique derived key from the event derivation key and the primary account hash;

encrypting the primary account hash with the unique derived key to generate an encrypted output;

performing one or more logical operations comprising one or more exclusive-or operations on the encrypted output and event-specific data associated with the event to generate a logical output; and encrypting the logical output with the unique derived key, thereafter forming the validation cryptogram;

search the validation cryptogram database to verify that the generated validation cryptogram matches one of the stored validation cryptograms; and output an indication that causes the physical barrier to open and permit the user access to the event upon verifying that the generated validation cryptogram matches one of the stored validation cryptograms.

* * * * *